(12) United States Patent
Mu

(10) Patent No.: US 12,278,699 B2
(45) Date of Patent: Apr. 15, 2025

(54) METHOD AND DEVICE FOR TRANSMITTING OR RECEIVING DOWNLINK CONTROL INFORMATION AND STORAGE MEDIUM

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 349 days.

(21) Appl. No.: 17/792,651

(22) PCT Filed: Jan. 15, 2020

(86) PCT No.: PCT/CN2020/072315
§ 371 (c)(1),
(2) Date: Jul. 13, 2022

(87) PCT Pub. No.: WO2021/142674
PCT Pub. Date: Jul. 22, 2021

(65) Prior Publication Data
US 2023/0038054 A1 Feb. 9, 2023

(51) Int. Cl.
*H04L 1/00* (2006.01)
*H04W 72/23* (2023.01)

(52) U.S. Cl.
CPC ........... *H04L 1/0004* (2013.01); *H04W 72/23* (2023.01)

(58) Field of Classification Search
CPC ....... H04L 1/0004; H04L 1/0028; H04L 1/08; H04L 1/0025; H04W 72/23; H04W 4/70; Y02D 30/70
See application file for complete search history.

(56) References Cited

U.S. PATENT DOCUMENTS

| | | | |
|---|---|---|---|
| 2019/0261399 A1* | 8/2019 | Munier | H04L 5/0051 |
| 2019/0274032 A1* | 9/2019 | Chatterjee | H04L 5/00 |
| 2019/0349978 A1 | 11/2019 | Lin et al. | |
| 2020/0396760 A1* | 12/2020 | Yi | H04L 1/1812 |
| 2021/0119722 A1* | 4/2021 | Munier | H04L 5/0055 |
| 2021/0219296 A1* | 7/2021 | Lei | H04L 1/0007 |
| 2022/0116171 A1* | 4/2022 | Zhang | H04L 5/0094 |

FOREIGN PATENT DOCUMENTS

| | | |
|---|---|---|
| CN | 110546971 A | 9/2019 |
| CN | 110546970 A | 12/2019 |

OTHER PUBLICATIONS

R4-160347 St. Julian's, Malta Ericsson UE demodulation requirement for Rel-13 eMTC (Year: 2016).*
(Continued)

*Primary Examiner* — Michael A Keller
*Assistant Examiner* — Thao D Duong
(74) *Attorney, Agent, or Firm* — Cozen O'Connor

(57) ABSTRACT

A method for transmitting downlink control information (DCI) includes: transmitting DCI based on modulation coding strategy (MCS) corresponding to user equipment (UE); in which the DCI includes a first-type DCI or a second-type DCI, the first-type DCI includes a first MCS field and a first repeating number indication field; and the second-type DCI includes a second MCS field and a second repeating number indication field.

20 Claims, 6 Drawing Sheets

(56) References Cited

OTHER PUBLICATIONS

R4-160347 St. Julian's, Malta Ericsson UE demodulation requirement for Rel-13 eMTC 2016 (Year: 2016).*
Indian Patent Application No. 202247045514, Office Action dated Nov. 17, 2022, 6 pages.
PCT/CN2020/072315 English translation of International Search Report dated Oct. 19, 2020, 2 pages.
Ericsson "UE demodulation requirement for Rel-13 eMTC"; 3GPP TSG-RAN WG4 Meeting #78 R4-160347; Feb. 2016; 6 pages.
European Patent Application No. 20914004.5, Search and Opinion dated Sep. 15, 2023, 12 pages.
LG Electronics "Downlink control channel related issues for MTC" 3GPP TSG RAN WG1 Meeting #80bis, R1-151487, Apr. 2015, 9 pages.
LG Electronics "Details on DCI contents for MTC" 3GPP TSG RAN WG1 Meeting #82, R1-154234, Aug. 2015, 6 pages.
Huawei, et al. "Supporting 64QAM for unicast PDSCH" 3GPP TSG RAN WG1 Meeting #88bis, R1-1704284, Apr. 2017, 2 pages.

* cited by examiner

METHOD AND DEVICE FOR TRANSMITTING OR RECEIVING DOWNLINK CONTROL INFORMATION AND STORAGE MEDIUM

CROSS-REFERENCE TO RELATED APPLICATION

This application is a U.S. national phase of International Application No. PCT/CN2020/072315, filed on Jan. 15, 2020, the entire content of which is incorporated herein by reference.

TECHNICAL FIELD

The disclosure relates to the field of wireless communication, and in particular, to a method and a device for transmitting or receiving downlink control information (DCI) and a storage medium.

BACKGROUND

In recent years, with the vigorous development of Internet of Things (IoT), it has brought a lot of convenience to people's lives and work. Machine-type communication (MTC) and narrow band Internet of Things (NB-IoT) are typical representatives of cellular Internet of Things technologies. At present, such technologies have been widely used in smart cities (such as reading meter), smart agriculture (for example collecting information such as temperature and humidity), smart transportation (such as shared bicycles) and many other fields.

Since MTC and NB-IoT are deployed mostly in basements and hardware of devices are limited, their coverage capabilities are not as good as conventional Long Term Evolution (LTE). Therefore, repeated transmission is usually used in MTC and NB-IoT to accumulate power, thereby achieving an effect of coverage enhancement. Simply, the repeated transmission means that the same transmission content is transmitted in multiple time units. This time unit may be one subframe or multiple subframes.

In addition, since MTC is deployed mostly in scenarios that are not easy to charge or replace batteries, such as the open country or the basement, the power saving in MTC and NB-IoT is a major feature of MTC and NB-IoT.

SUMMARY

According to a first aspect of the disclosure, a method for transmitting DCI is provided, comprising: transmitting DCI based on MCS corresponding to user equipment (UE); wherein, the DCI comprises a first-type DCI or a second-type DCI, the first-type DCI comprises a first MCS field and a first repetition number indicator field; and the second-type DCI comprises a second MCS field and a second repetition number indicator field.

According to a second aspect of the disclosure, a method for receiving DCI is provided, comprising: receiving DCI transmitted based on MCS corresponding to UE; wherein, the DCI comprises a first-type DCI or a second-type DCI, the first-type DCI comprises a first MCS field and a first repetition number indicator field; and the second-type DCI comprises a second MCS field and a second repetition number indicator field.

According to a third aspect of the disclosure, a communication device is provided, comprising: an antenna; a memory; and a processor, connected respectively to the antenna and the memory, configured to, by executing an executable program stored on the memory, control the antenna to transmit and receive wireless signals and perform the method for transmitting DCI or the method for receiving DCI as described above in any aspect.

According to a fourth aspect of the disclosure, a non-transitory computer-readable storage medium is provided. The non-transitory computer-readable storage medium has stored therein an executable program. When the executable program is executed by a processor, the method for transmitting DCI or the method for receiving DCI as described above in any aspect is performed.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The terms used in the disclosure are only for the purpose of describing specific embodiments, and are not intended to limit the disclosure. The singular forms of "a", "said" and "the" used in the disclosure and appended claims are also intended to include plural forms, unless the context clearly indicates other meanings. It should also be understood that the term "and/or" as used herein refers to and includes any or all possible combinations of one or more associated listed items.

It should be understood that although the terms first, second, and third may be used in this disclosure to describe various information, the information should not be limited to these terms. These terms are only used to distinguish the same type of information from each other. For example, without departing from the scope of the disclosure, the first information may also be referred to as the second information, and similarly, the second information may also be referred to as the first information. Depending on the context, the word "if" as used herein can be interpreted as "when", "while" or "in response to determining".

Figure 1:
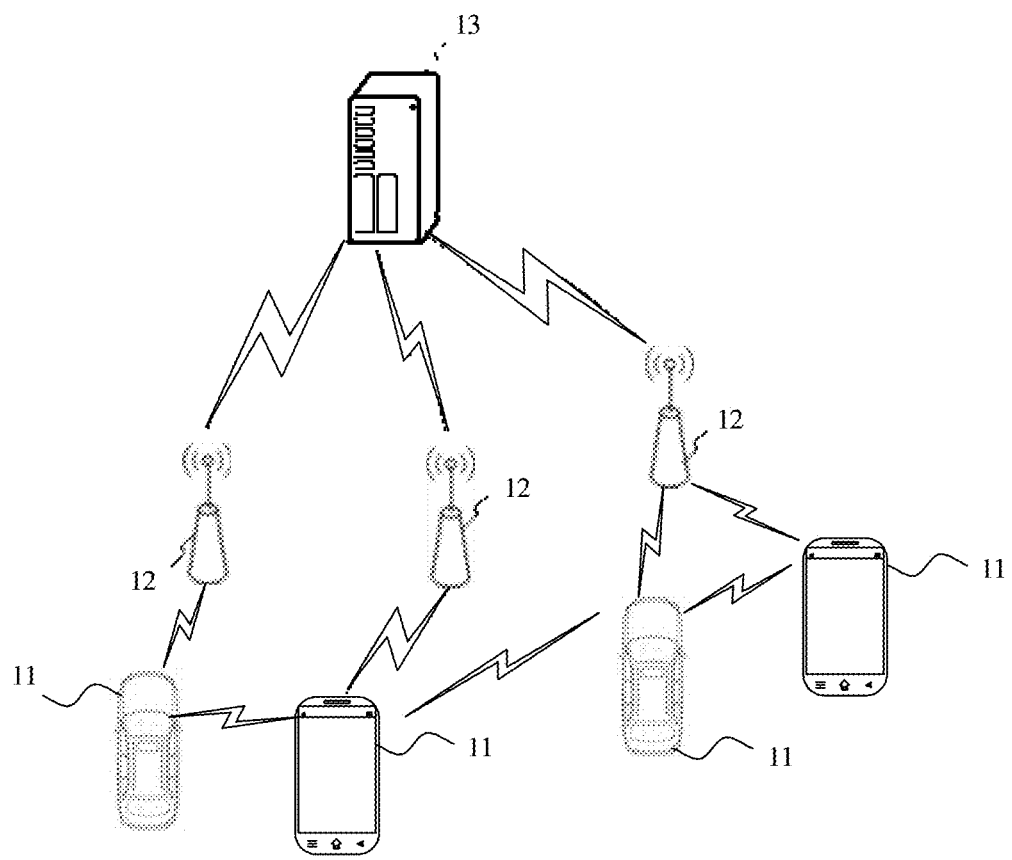
FIG. 1 is a schematic diagram of a wireless communication system, according to embodiments of the disclosure.

FIG. 1 is a schematic diagram of a wireless communication system according to embodiments of the disclosure. As illustrated in FIG. 1, the wireless communication system is a communication system based on cellular mobile communication technologies. The wireless communication system may include terminals 11 and base stations 12.

The terminal 11 may be a device that provides voice and/or data connectivity to a user. The terminal 11 can communicate with one or more core networks via a radio access network (RAN). The terminal 11 can be an IoT terminal such as a sensor device, a mobile phone (or a cellular phone) and a computer with the IoT terminal such as a fixed, portable, pocket-sized, handheld, built-in computer or vehicle-mounted device, for example, station (STA), subscriber unit, subscriber station, mobile station, mobile, remote station, access point, remote terminal, access terminal, user terminal, user agent, user device, or user equipment (UE). Alternatively, the terminal 11 may also be an unmanned aircraft. Alternatively, the terminal 11 may also be an in-vehicle device, for example, a trip computer having a wireless communication function or a wireless communication device connected to the trip computer. Alternatively, the terminal 11 may also be a roadside device, for example, a street lamp, a signal lamp or other roadside device having the wireless communication function.

The base station 12 may be a network side device in the wireless communication system. The wireless communication system may be the $4^{th}$ generation mobile communication (4G) system, also known as the long term evolution (LTE) system. The wireless communication system may also be the $5^{th}$ generation mobile communication (5G) system, also known as the new radio (NR) system or 5G NR system. Alternatively, the wireless communication system may also be a next-generation system of the 5G system. The access network in the 5G system can be called the new generation-radio access network (NG-RAN). The wireless communication system may also be the MTC system.

The base station 12 may be an evolved base station (eNB) adopted in the 4G system. Alternatively, the base station 12 may also be a base station (gNB) adopting a centralized and distributed architecture in the 5G system. When the base station 12 adopts the centralized distributed architecture, it usually includes a central unit (CU) and at least two distributed units (DUs). The CU is provided with a packet data convergence protocol (PDCP) layer, a radio link control (RLC) layer and a protocol stack having a media access control (MAC) layer. The DU is provided with a protocol stack having a physical (PHY) layer. The embodiment of the disclosure does not limit the specific implementation manner of the base station 12.

A wireless link can be established between the base station 12 and the terminal 11 through a wireless air interface. In different embodiments, the wireless air interface is a wireless air interface based on the 4G standard. Alternatively, the wireless air interface is a wireless air interface based on the 5G standard, for example, the wireless air interface is a NR. The wireless air interface can also be a wireless air interface based on a standard of next generation mobile communication network technology based on the 5G standard.

In some embodiments, an end to end (E2E) link may also be established between the terminals 11, for example, a vehicle to vehicle (V2V) communication, a vehicle to infrastructure (V2I) communication and a vehicle to pedestrian (V2P) communication in a vehicle to everything (V2X) communication.

In some embodiments, the above wireless communication system may also include a network management device 13.

The base stations 12 are coupled to the network management device 13 respectively. The network management device 13 may be a core network device in the wireless communication system. For example, the network management device 13 may be a mobility management entity (MME) of an evolved packet core (EPC). Alternatively, the network management device may also be other core network devices, such as a serving gateway (SGW), a public data network gateway (PGW), a policy and charging rules function (PCRF) unit or a home subscriber server (HSS). The implementation form of the network management device 13 is not limited in the embodiments of the disclosure.

On modulation and coding scheme (MCS) and transfer block size (TBS) in NB-IoT, for downlink of NB-IoT, there is a 4-bit MCS field in the DCI to indicate a downlink MCS index ($I_{MCS}$) and a TBS index ($I_{TBS}$) is determined based on a relationship between MCS indexes and TBS indexes. In the downlink, $I_{MCS}=I_{TBS}$. Furthermore, the TBS transmitted can be further determined by using the TBS index and the amount of allocated resources. However, with the development of technologies, various types of terminal devices are developing. For example, for a NB-IoT device, it is an urgent problem to be solved in the related art how to design the relationship between the amount of resources and the TBS value and how to satisfy requirements of further development of communication technologies such as satisfying requirements of communication capacity expansion or power consumption reduction, while being compatible with the existing technologies.

Figure 2A:
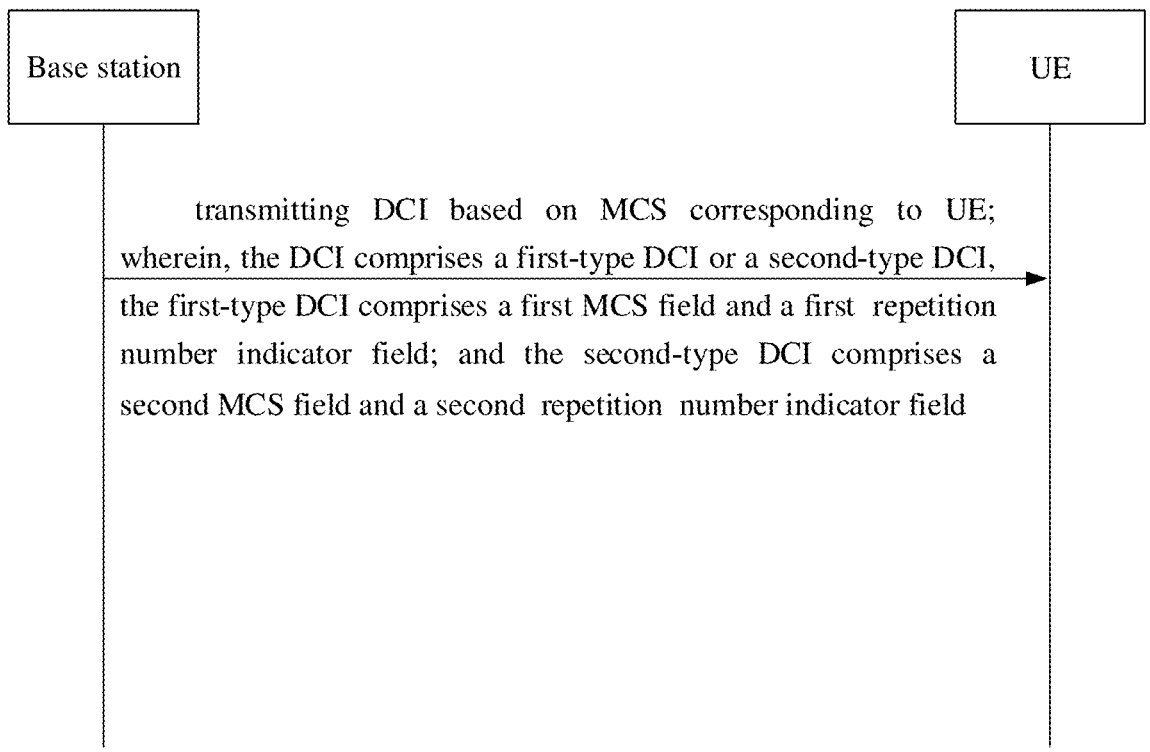
FIG. 2A is a flowchart of a method for transmitting DCI, according to embodiments of the disclosure.

As illustrated in FIG. 2A, a method for transmitting DCI is provided in embodiments of the disclosure, including: transmitting DCI based on a MCS corresponding to UE, in which, the DCI includes a first-type DCI or a second-type DCI, the first-type DCI includes a first MCS field and a first repetition number indicator field, and the second-type DCI includes a second MCS field and a second repetition number indicator field.

For example, the first-type DCI corresponds to a UE that supports a first MCS and the second-type DCI corresponds to a UE that does not support the first MCS.

In some cases, the UE that supports the first MCS may include UE configured to be capable of using the first MCS and the UE that does not support the first MCS may include UE not configured to be capable of using the first MCS.

Figure 2B:
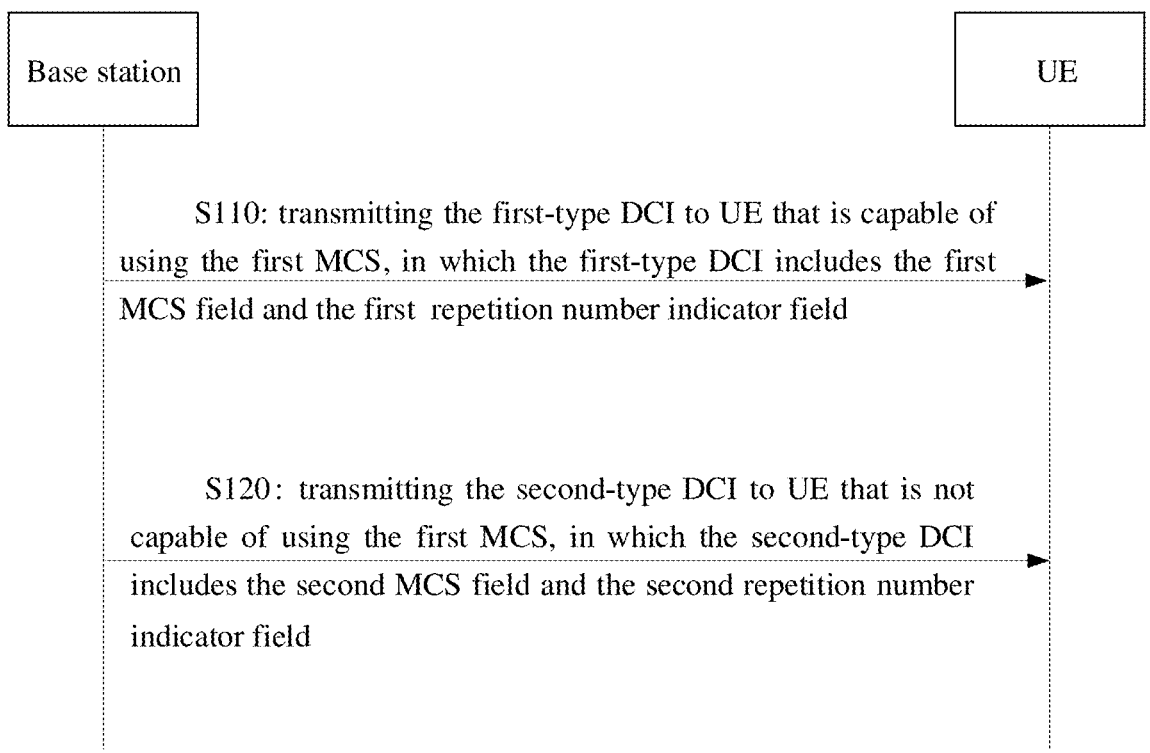
FIG. 2B is a flowchart of a method for transmitting DCI, according to embodiments of the disclosure.

As illustrated in FIG. 2B, a method for transmitting DCI is provided in embodiments of the disclosure, including the following S110 and S120.

S110, the first-type DCI is transmitted to UE that is configured to be capable of using the first MCS, in which the first-type DCI includes the first MCS field and the first repetition number indicator field.

S120, the second-type DCI is transmitted to UE that is not capable of using the first MCS, in which the second-type DCI includes the second MCS field and the second repetition number indicator field.

In some embodiments, a bit length of the first MCS field is longer than a bit length of the second MCS field; and a bit length of the first repetition number indicator field is shorter than a bit length of the second repetition number indicator field. It is noted herein that there is no certain sequence relationship between S110 and S120. S110 may be before S120 or S120 may be before S110.

The method is applied in a base station. For example, the DCI is transmitted on a physical downlink control channel (PDCCH).

The first MCS field and the second MCS field in the first-type DCI and the second-type DCI are collectively referred to as the MCS field. The MCS field at least carries an MCS index. The MCS index is configured to indicate the MCS. The repetition number indicator field is configured to indicate the number of repeated transmissions of the same content.

Both the first-type DCI and the second-type DCI may be the DCI that may be transmitted to the first-type UE.

The "first-type" and the "second-type" in the first-type DCI and the second-type DCI refer to general terms, which distinguish two different types of DCI, but both the first-type DCI and the second-type DCI are a kind of DCI.

In some embodiments, the first-type UE may be a late-stage evolution device of NB-IoT. The second-type UE other than the first-type UE is an early device of NB-IoT.

The early devices herein may include, but are not limited to, communication devices specified in the communication protocol (Release) 13, 14, 15 or 16.

The base station may transmit the first-type DCI and the second-type DCI on a narrow band PDCCH (NPDCCH).

The NPDCCH is used for narrow band communication while the conventional PDCCH is used for broad band communication. Narrow band and broad band herein are commonly-used concepts in cellular mobile communications and will not be described herein.

Some first-type UEs may support the second MCS and may also support the first MCS. Also, some first-type UEs may only support the first MCS. Generally, all the second-type UEs support the second MCS.

The physical transmission rate corresponding to the second MCS is lower than the physical transmission rate of the first MCS. For example, the first MCS is the higher-order modulation and decoding scheme than the second MCS.

For example, the second MCS includes but is not limited to binary phase shift keying (BPSK) and quaternary phase shift keying (QPSK). For example, the first MCS includes but is not limited to quadrature amplitude modulation (QAM). For example, QAM is 16QAM.

The first repetition number indicator field and the second repetition number indicator field may be collectively referred to as the repetition number indicator field, and both are configured to indicate the number of repeated transmissions.

In some embodiments of the disclosure, the first-type DCI and the second-type DCI use the same DCI format. A sum of bit lengths of the first MCS field and the first repetition number indicator field is the same as a sum of bit lengths of the second MCS field and the second repetition number indicator field.

The bit length herein can be understood as the number of bits.

In some embodiments of the disclosure, the first MCS is introduced to be compatible with the original DCI format and reduce the bit overhead as much as possible. In some embodiments of the disclosure, studies have found that when the first MCS is used, the channel quality is generally good, the transmission effect is good and the number of repeated transmissions is small. At this time, a part of bits of the repetition number indicator field is used with the original MCS field to form a new extended MCS field for MCS indicator. The extended MCS field herein is the aforementioned first MCS field. The original MCS field may be understood as the second MCS field.

Since the part of bits of the repetition number indicator field is used with the second MCS field to form the extended MCS field for indicating the MCS index, it is equivalent to that, compared to the second MCS field, the first MCS field increases the number of bits that can indicate the MCS index. In this way, the number of MCS indexes that can be indicated increases, so that it can cover the newly-introduced first MCS.

For example, the second repetition number indicator field includes high-order bits and low-order bits, and the high-order bits or the low-order bits can be selected as a first part of bits, and the remaining bits can be as a second part of bits.

For another example, in some embodiments, a part of bits, close to the second MCS field, is selected as the first part of bits to facilitate the terminal's decoding.

In some embodiments, the first MCS field includes the second MCS field and a first part of bits of the second repetition number indicator field; and the first repetition number indicator field includes a second part of bits of the second repetition number indicator field.

In some embodiments of the disclosure, the second MCS field is a component of the first MCS field. In addition, the first MCS field further includes a part of bits of the second repetition number indicator field and this part of bits is referred to as the first part of bits. The first part of bits herein can be one or more bits. When the base station transmits the DCI, the DCI may be divided into two types, i.e., the first-type DCI and the second-type DCI, according to whether the MCS field needs to borrow the first part of the repetition number indicator field to indicate the MCS index.

In some embodiments, the first repetition number indicator field includes one of the following: a repeated-transmission number indicator field on a data channel; and a repeated-transmission number indicator field on a control channel.

The data channel is generally used to transmit service data and the control channel is used to transmit control signalings.

The data channel includes, but is not limited to, a physical downlink shared channel (PDSCH) and/or a physical uplink shared channel (PUSCH). The control channel includes, but is not limited to a PDCCH and/or a physical uplink control channel (PUCCH).

The PDSCH herein may include but is not limited to a narrow band PDSCH (NPDSCH).

The PUSCH herein may include but is not limited to a narrow band PUSCH (NPUSCH).

The PDCCH herein may include but is not limited to a narrow band PDCCH (NPDCCH).

The PUSCH herein may include but is not limited to a narrow band PUCCH (NPUCCH).

In some embodiments, the first repetition number indicator field in the first-type DCI corresponds to a first candidate set, in which the first candidate set includes one or more candidate numbers of repeated transmissions that can be indicated.

The second repetition number indicator field in the second-type DCI corresponds to a second candidate set, in which the second candidate set includes one or more candidate numbers of repeated transmissions.

The first candidate set is a subset of the second candidate set.

The number of repeated transmissions indicated by the first repetition number indicator field is any number of repeated transmissions in the first candidate set. The first candidate set is a subset of the second candidate set corresponding to the repetition number indicator field in the second-type DCI.

For example, one or more smaller candidate numbers of repeated transmissions in the second candidate set are selected to form the first candidate set, thus achieving the good compatibility with the related art.

According to different channel types, different selection manners are used to select one or more candidate numbers of repeated transmissions from the corresponding second candidate set to form the first candidate set to adapt to transmission requirements of different channel types, for example, quality of service (QOS).

In some embodiments, when the first repetition number indicator field includes a repetition number indicator field for repeated transmissions on a data channel, candidate numbers of repeated transmissions in the first candidate set, respectively corresponding to a repetition number indicator field for a PUSCH and a repetition number indicator field for a PDSCH, are extracted from the second candidate set by different selection manners.

In some embodiments, the one or more candidate numbers of repeated transmissions in the first candidate set includes: one or more minimum candidate numbers of repeated transmissions, extracted from the second candidate set.

In some embodiments, the one or more candidate numbers of repeated transmissions in the first candidate set includes: one or more candidate numbers of repeated transmissions, uniformly extracted from the second candidate set.

The multiple candidate numbers of repeated transmissions in the second candidate set are sorted sequentially. The uniform extraction herein may be according to the sorting. For example, one candidate number of repeated transmissions may be extracted every one or more candidate numbers to form the first candidate set. In this way, basically for the scenario where the first MCS is applied, there can still be the relatively large number of repeated transmissions if necessary.

In some embodiments, the one or more candidate numbers of repeated transmissions in the first candidate set includes: one or more candidate numbers of repeated transmissions, non-uniformly extracted from the second candidate set.

The non-uniform extraction is: the number of candidate numbers of repeated transmissions that are not extracted in the interval between multiple candidate numbers of repeated transmissions in the first candidate set is different.

For example, in the case of non-uniform extraction, the one or more candidate numbers of repeated transmissions can be selected more freely according to the wireless communication environment or empirical values.

In some embodiments, the one or more candidate numbers of repeated transmissions in the first candidate set includes: M candidate numbers of repeated transmissions, less than or equal to a preset number, extracted from the second candidate set, and N candidate numbers of repeated transmissions, greater than the preset number, extracted from the second candidate set, M is greater than N, and both M and N are positive integers.

For example, in the case of non-uniform extraction, considering that the channel conditions when the first MCS is used are better, the smaller candidate numbers of repeated transmissions extracted from the second candidate set should be more; and the larger candidate numbers of repeated transmissions may be possible to be extracted for a few, which corresponds to the actual application probability or frequency and improves the practicability.

The preset value may be a preset empirical value or stored in advance by the base station.

Figure 3A:
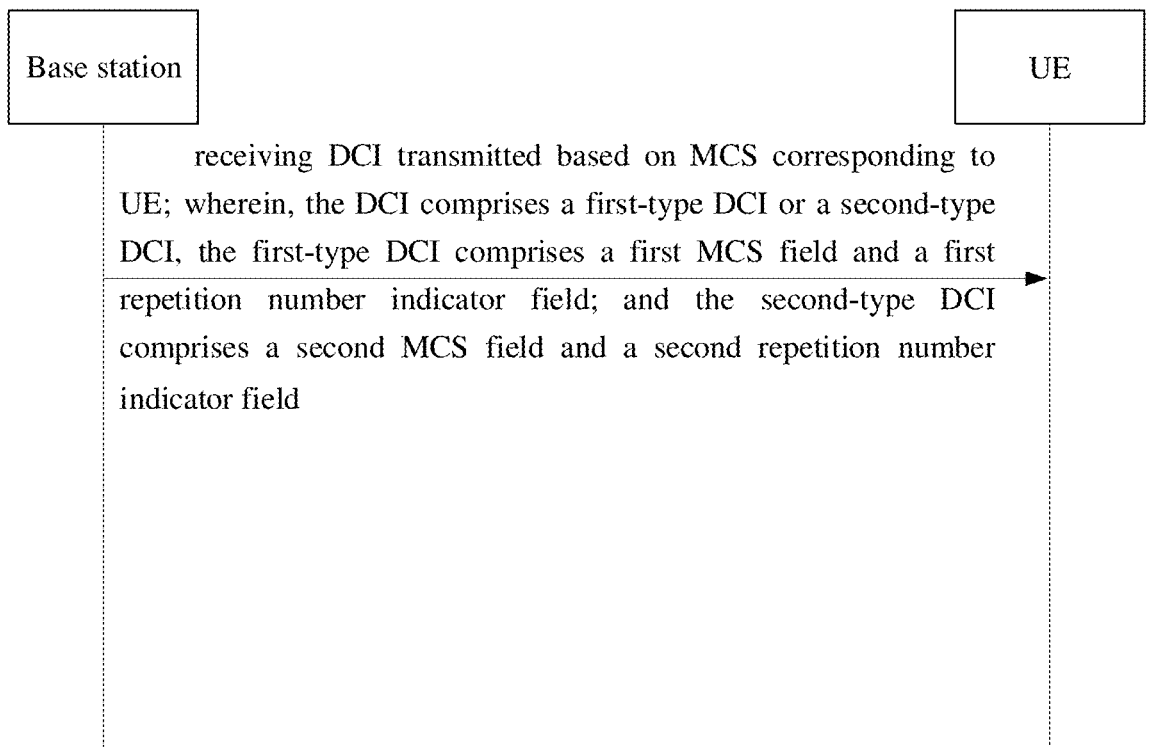
FIG. 3A is a flowchart of a method for receiving DCI, according to embodiments of the disclosure.

As illustrated in FIG. 3A, a method for receiving DCI is provided in embodiments of the disclosure, including:

receiving DCI transmitted based on a MCS corresponding to UE, in which, the DCI includes a first-type DCI or a second-type DCI, the first-type DCI includes a first MCS field and a first repetition number indicator field, and the second-type DCI includes a second MCS field and a second repetition number indicator field.

In some embodiments, the first-type DCI corresponds to a UE that supports the first MCS, and the second-type DCI corresponds to a UE that does not support the first MCS.

Figure 3B:
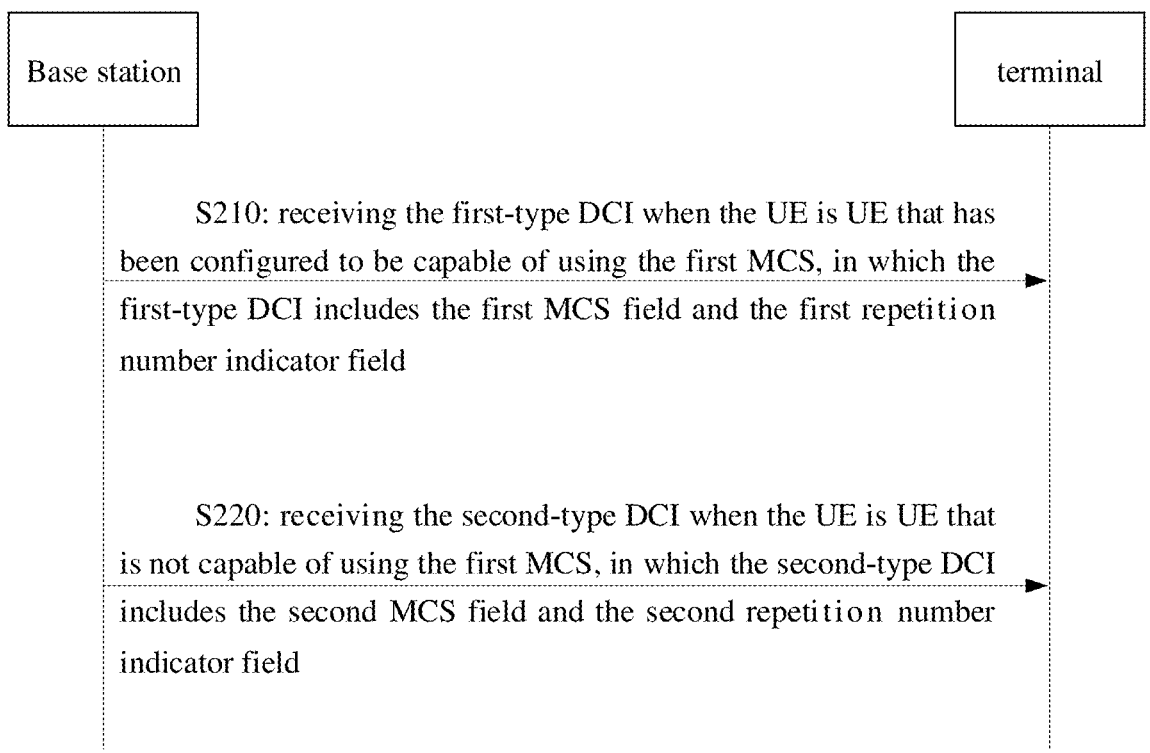
FIG. 3B is a flowchart of a method for receiving DCI, according to embodiments of the disclosure.

As illustrated in FIG. 3B, a method for receiving DCI is provided in embodiments of the disclosure, including the following S210 and S220.

S210: the first-type DCI is received when the UE is UE that has been configured to be capable of using the first MCS, in which the first-type DCI includes the first MCS field and the first repetition number indicator field.

S220: the second-type DCI is received when the UE is UE that is not capable of using the first MCS, in which the second-type DCI includes the second MCS field and the second repetition number indicator field.

In some embodiments, a bit length of the first MCS field is longer than a bit length of the second MCS field; and a bit length of the first repetition number indicator field is shorter than a bit length of the second repetition number indicator field.

It is noted herein that there is no certain sequence relationship between S210 and S220. S210 may be before S220 or S220 may be before S210.

The UE may determine the type of the received DCI according to whether it is configured to use the first MCS or can use the first MCS. Therefore, at this time, what the UE receives may be the first-type DCI or the second-type DCI.

For example, if the base station configures one or more UEs that the UEs can use the first MCS by radio resource control (RRC), the UE can consider that it is receiving the first-type DCI.

It is noted that the first-type DCI and the second-type DCI can be the same DCI format. In this way, without changing the DCI format and also in the case of introducing the first MCS, without increasing the DCI bit overhead, the indicator of the MCS index in the case where the first MCS can be used is realized.

In some embodiments, the first repetition number indicator field includes one of: a repeated-transmission number indicator field on a data channel; and a repeated-transmission number indicator field on a control channel.

For specific examples of the control channel and the data channel herein, reference may be made to the foregoing embodiments, and will not be repeated herein.

In some embodiments, the first repetition number indicator field in the first-type DCI corresponds to a first candidate set, in which the first candidate set includes one or more candidate numbers of repeated transmissions.

The second repetition number indicator field in the second-type DCI corresponds to a second candidate set, in which the second candidate set includes one or more candidate numbers of repeated transmissions.

The first candidate set is a subset of the second candidate set.

The first candidate set is a subset of the second candidate set. In this way, the compatibility with the related art can be better achieved.

In some embodiments, when the first repetition number indicator field includes a repetition number indicator field for repeated transmissions on a data channel, candidate numbers of repeated transmissions in the first candidate set, respectively corresponding to a repetition number indicator field for a PUSCH and a repetition number indicator field for a PDSCH, are extracted from the second candidate set by different selection manners.

For example, the one or more candidate numbers of repeated transmissions in the first candidate set includes: one or more minimum candidate numbers of repeated transmissions, extracted from the second candidate set.

For another example, the one or more candidate numbers of repeated transmissions in the first candidate set includes: one or more candidate numbers of repeated transmissions, uniformly extracted from the second candidate set.

In some embodiments, the one or more candidate numbers of repeated transmissions in the first candidate set includes: one or more candidate numbers of repeated transmissions, non-uniformly extracted from the second candidate set.

In some embodiments, the one or more candidate numbers of repeated transmissions in the first candidate set includes: M candidate numbers of repeated transmissions, less than or equal to a preset number, extracted from the second candidate set, and N candidate numbers of repeated transmissions, greater than the preset number, extracted from the second candidate set, M is greater than N, and both M and N are positive integers.

For example, some embodiments of the disclosure provide a method for transmitting DCI. The method for transmitting DCI may be for a first-type UE, for example, for an NB-IoT device. The DCI may be the aforementioned first-type DCI or the second-type DCI. Herein, the method for transmitting DCI may include the following.

According to characteristics of the UE using 16QAM, the DCI is redesigned so that it can reuse other useless information fields and reduce the overhead of the DCI. The UE in some embodiments at least includes the aforementioned first-type UE.

For example, for the UE that can use 16QAM, it indicates that the channel conditions are relatively good, and under good channel conditions, the UE will rarely use the number of repeated transmissions or the number of repeated transmissions used is relatively small. Therefore, the core of the solution is that a part of bits for indicating the number of repeated transmissions may be multiplexed to indicate the additional MCS index.

Case 1: for the UE that has been configured to use 16QAM, the information bits included in the DCI for indicating the repeated transmission of the data channel when 16QAM is not configured, is multiplexed to indicate the MCS index. The indication bits of the MCS index are 5 bits in total, 4 bits come from the MCS field included in the DCI when 16QAM is not configured, and the other bit comes from the repetition number indicator field included in the DCI when 16QAM is not configured.

For uplink transmission, in the DCI that is not configured to use 16QAM, there are 4 indicator bits for the repetition number, of which the first part of bits is used to indicate the MCS index. Originally, there are 3 bits, i.e., 4 bits minus the first part of bits, which is used as the second part of bits.

As the information field bits for indicating the number of repeated transmissions of data decrease, the set of optional repetition numbers that the base station can indicate will also decrease. For the NPUSCH or NPDSCH, the direct mapping relationship between DCI information bits and the number of repeated transmissions is shown in Tables 1 and 2 below.

Table 1 and Table 2 respectively show the repeated transmission sets of the NPUSCH and NPDSCH supported in the current NB-IoT, $N_{Rep}$ is the number of repeated transmissions of NPUSCH or NPDSCH, and $I_{Rep}$ is an index of the number of repeated transmissions of NPUSCH or NPDSCH.

TABLE 1

| $I_{Rep}$ | $N_{Rep}$ |
|---|---|
| 0 | 1 |
| 1 | 2 |
| 2 | 4 |
| 3 | 8 |
| 4 | 16 |
| 5 | 32 |
| 6 | 64 |
| 7 | 128 |

TABLE 2

| $I_{Rep}$ | $N_{Rep}$ |
|---|---|
| 0 | 1 |
| 1 | 2 |
| 2 | 4 |
| 3 | 8 |
| 4 | 16 |
| 5 | 32 |
| 6 | 64 |
| 7 | 128 |
| 8 | 192 |
| 9 | 256 |
| 10 | 384 |
| 11 | 512 |
| 12 | 768 |
| 13 | 1024 |
| 14 | 1536 |
| 15 | 2048 |

When the information field indicating repeated transmission is reduced by 1 bit, the indicated numbers of repeated transmissions may be halved. At this time, there are several ways to extract the repetition numbers supported, which can be one of the following.

Manner 1: the small number of repeated transmissions may be extracted only. That is, for the NPUSCH, the candidate numbers of repeated transmissions are {1, 2, 4, 8}, and for the NPDSCH, the candidate numbers of repeated transmissions are {1, 2, 4, 8, 16, 32, 64, 128}.

Manner 2: uniform extraction. For example, for the NPUSCH, {1,4,16,64} is extracted. For the NPDSCH, {1, 4, 16, 64, 256, 512, 1024, 2048} is extracted.

Manner 3: non-uniform extraction, extracting more small numbers of repeated transmissions. For example, for the PUSCH, if the number of repeated transmissions is less than 8, (1, 2, 4) are extracted, and for those greater than 8, (32) is extracted. That is, the numbers of repeated transmissions finally supported is {1, 2, 4, 32}.

For the above manners, the manners for reducing the numbers of repeated transmissions for the NPUSCH and NPDSCH can be different or the same.

In other embodiments, for the UE that has been configured to use 16QAM, the information bits of the repetition number indicator field of the control channel may be multiplexed to indicate the MCS index.

That is, the bits indicating the MCS index in the first-type DCI are: 4+1 bits, a total of 5 bits. 4 bits are bits contained in the first MCS field in the second-type DCI when 16QAM is not configured, and 1 bit is the borrowed bit of the repetition number indicator field of the control channel included in the second-type DCI when 16QAM is not configured.

Similar to the foregoing manner, in some embodiments, it is also necessary to consider how to extract the number supported of repeated transmissions. At this time, the first manner and the second manner can be reused. For example, the originally supported numbers of repeated transmissions in the DCI is {R1, R2, R3, R4}, and then the extracted repeated transmission set at this time can be {R1, R2} or {R1, R3}.

Of course, the third manner can also be adopted, the predetermined value is R3, one is extracted from R1 to R3, and 0 is extracted from R4.

Because the number of TBS values or the number of MCSs that support 16QAM is different under different resource allocations, it may be necessary to expand the MCS field under some resource allocations, but does not need to expand the MCS field under other resource allocations. There are two ways to deal with the above method at this time.

The first way is to use a unified manner for all resource allocations, that is, as long as the terminal is configured to support 16QAM, the above manner is used for all resource allocations.

The second way: for the resource allocations that actually need to expand the MCS field, manner one or manner two may be used, and the original manner is still used for other cases that do not need to be extended. That is, whether to borrow the part of bits of the second repetition number indicator field and then with the original second MCS field to form an extended MCS field (that is, the first MCS field) can be determined according to different situations.

One way is to use the first part of bits of the original second repetition number indicator field and the original first MCS field to form an extended first MCS field for the first MCS that can be used in a unified configuration.

In other cases, the above manner is determined to be used according to the current actual network conditions, for example, the configuration can be used, but the first MCS may not be activated for use through the MAC signaling or the DCI. At this time, it can be determined whether to use the repetition number indicator field and the original MCS field (that is, the second MCS field) to indicate the MCS index together according to whether the first MCS is used or not, which can be determined according to different situations. For example, if the configuration of the first MCS is activated, some bits of the second repetition number indicator field and the original second MCS field are used to form the extended first MCS to indicate the MCS index.

In some embodiments, the first MCS is 16QAM.

Figure 4:
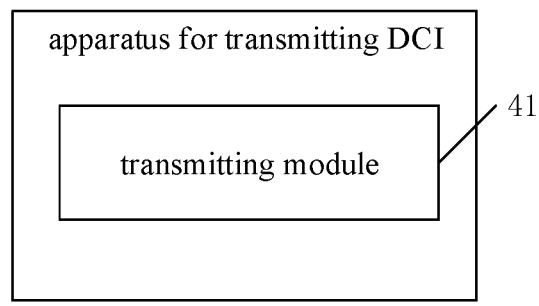
FIG. 4 is a block diagram of an apparatus for transmitting DCI, according to embodiments of the disclosure.

As illustrated in FIG. 4, an apparatus for transmitting DCI is provided in embodiments of the disclosure, including: a transmitting module 41, configured to transmit DCI based on a MCS corresponding to a UE; in which, the DCI includes a first-type DCI or a second-type DCI, the first-type DCI includes a first MCS field and a first repetition number indicator field, and the second-type DCI includes a second MCS field and a second repetition number indicator field.

In some embodiments, the transmitting module 41 may be a program module and the program module can transmit the first-type DCI after being executed by a processor.

In some embodiments, the transmitting module 41 may be a combination module of software and hardware; and the combination module of software and hardware may include various programmable arrays; and the programmable array includes, but is not limited to, a complex programmable array or a field programmable array.

In some other embodiments, the transmitting module 41 may further include a pure hardware module. The pure hardware module may include an application specific integrated circuit.

In some embodiments, the first-type DCI corresponds to a UE that supports a first MCS and the second-type DCI corresponds to a UE that does not support the first MCS.

In some embodiments, the first MCS field includes the second MCS field and a first part of bits of the second repetition number indicator field; and the first repetition number indicator field includes a second part of bits of the second repetition number indicator field.

In some embodiments, a bit length of the first MCS field is longer than a bit length of the second MCS field; and a bit length of the first repetition number indicator field is shorter than a bit length of the second repetition number indicator field.

In some embodiments, the first repetition number indicator field includes one of: a repeated-transmission number indicator field on a data channel; and a repeated-transmission number indicator field on a control channel.

In some embodiments, the first repetition number indicator field in the first-type DCI corresponds to a first candidate set, in which the first candidate set includes one or more candidate numbers of repeated transmissions.

The second repetition number indicator field in the second-type DCI corresponds to a second candidate set, in which the second candidate set includes one or more candidate numbers of repeated transmissions.

The first candidate set is a subset of the second candidate set.

In some embodiments, when the first repetition number indicator field includes a repetition number indicator field for repeated transmissions on a data channel, candidate numbers of repeated transmissions in the first candidate set, respectively corresponding to a repetition number indicator field for a physical uplink shared channel (PUSCH) and a repetition number indicator field for a physical downlink shared channel (PDSCH), are: extracted from the second candidate set by different selection manners.

In some embodiments, the one or more candidate numbers of repeated transmissions in the first candidate set includes: one or more minimum candidate numbers of repeated transmissions, extracted from the second candidate set.

In some embodiments, the one or more candidate numbers of repeated transmissions in the first candidate set includes: one or more candidate numbers of repeated transmissions, uniformly extracted from the second candidate set.

In some embodiments, the one or more candidate numbers of repeated transmissions in the first candidate set includes: one or more candidate numbers of repeated transmissions, non-uniformly extracted from the second candidate set.

In some embodiments, the one or more candidate numbers of repeated transmissions in the first candidate set includes: M candidate numbers of repeated transmissions, less than or equal to a preset number, extracted from the second candidate set, and N candidate numbers of repeated transmissions, greater than the preset number, extracted from the second candidate set, M is greater than N, and both M and N are positive integers. In some embodiments, the first MCS is 16QAM.

Figure 5:
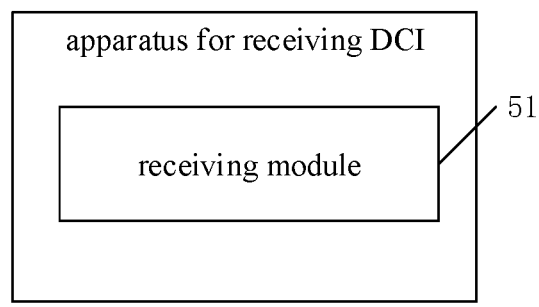
FIG. 5 is a block diagram of an apparatus for receiving DCI, according to embodiments of the disclosure.

As illustrated in FIG. 5, an apparatus for receiving DCI is provided in embodiments of the disclosure, including: a receiving module 51, configured to receive DCI transmitted based on a MCS corresponding to the UE; in which, the DCI includes a first-type DCI or a second-type DCI, the first-type DCI includes a first MCS field and a first repetition number indicator field, and the second-type DCI includes a second MCS field and a second repetition number indicator field.

In some embodiments, the receiving module 51 may be a program module and the program module can receive the first-type DCI after being executed by a processor.

In some embodiments, the receiving module 51 may be a combination module of software and hardware; and the combination module of software and hardware may include various programmable arrays; and the programmable array includes, but is not limited to, a complex programmable array or a field programmable array.

In some other embodiments, the receiving module 51 may further include a pure hardware module. The pure hardware module may include an application specific integrated circuit.

In some embodiments, the first-type DCI corresponds to a UE that supports a first MCS and the second-type DCI corresponds to a UE that does not support the first MCS.

In some embodiments, the first MCS field includes the second MCS field and a first part of bits of the second repetition number indicator field; and the first repetition number indicator field includes a second part of bits of the second repetition number indicator field.

In some embodiments, a bit length of the first MCS field is longer than a bit length of the second MCS field; and a bit length of the first repetition number indicator field is shorter than a bit length of the second repetition number indicator field.

In some embodiments, the first repetition number indicator field includes one of: a repeated-transmission number indicator field on a data channel; and a repeated-transmission number indicator field on a control channel.

In some embodiments, the first repetition number indicator field in the first-type DCI corresponds to a first candidate set, in which the first candidate set includes one or more candidate numbers of repeated transmissions.

The second repetition number indicator field in the second-type DCI corresponds to a second candidate set, in which the second candidate set includes one or more candidate numbers of repeated transmissions.

The first candidate set is a subset of the second candidate set.

In some embodiments, when the first repetition number indicator field includes a repetition number indicator field for repeated transmissions on a data channel, candidate numbers of repeated transmissions in the first candidate set, respectively corresponding to a repetition number indicator field for a physical uplink shared channel (PUSCH) and a repetition number indicator field for a physical downlink shared channel (PDSCH), are: extracted from the second candidate set by different selection manners.

In some embodiments, the one or more candidate numbers of repeated transmissions in the first candidate set includes: one or more minimum candidate numbers of repeated transmissions, extracted from the second candidate set.

In some embodiments, the one or more candidate numbers of repeated transmissions in the first candidate set includes: one or more candidate numbers of repeated transmissions, uniformly extracted from the second candidate set.

In some embodiments, the one or more candidate numbers of repeated transmissions in the first candidate set includes: one or more candidate numbers of repeated transmissions, non-uniformly extracted from the second candidate set.

In some embodiments, the one or more candidate numbers of repeated transmissions in the first candidate set includes: M candidate numbers of repeated transmissions, less than or equal to a preset number, extracted from the second candidate set, and N candidate numbers of repeated transmissions, greater than the preset number, extracted from the second candidate set, M is greater than N, and both M and N are positive integers.

In some embodiments, the first MCS is 16QAM.

Some embodiments of the disclosure also provide a communication device, including: an antenna; a memory; and a processor, connected respectively to the antenna and the memory, and configured to, by executing an executable program stored on the memory, control the antenna to transmit and receive wireless signals and perform the method for transmitting or receiving DCI provided in any of the foregoing embodiments.

The communication device provided in some embodiments may be the aforementioned terminal or base station. The terminal can be a variety of human-borne terminals or vehicle-mounted terminals. The base station may be various types of base stations, for example, 4G base stations or 5G base stations.

The antenna may be various types of antennas, for example, a mobile antenna such as a 3G antenna, a 4G antenna or a 5G antenna; and the antenna may also include a Wi-Fi antenna or a wireless charging antenna.

The memory may include various types of storage media. The storage medium is a non-transitory computer storage medium that can continue to memorize and store information thereon after the communication device is powered off.

The processor may be connected to the antenna and the memory through a bus, etc., for reading the executable program stored on the memory, for example, the methods for transmitting or receiving DCI in FIG. 2A, FIG. 2B, FIG. 3A and FIG. 3B.

Some embodiments of the disclosure also provide a non-transitory computer-readable storage medium that stores an executable program, where the executable program is executed by a processor to implement actions of the method for transmitting DCT or receiving DCT, for example, at least one of the methods in FIG. 2A, FIG. 2B, FIG. 3A and FIG. 3B.

In embodiments of the disclosure, the DCI is transmitted based on the MCS corresponding to the UE. Thus, the DCI is divided into two types based on different MCSs, namely the first-type DCI and the second-type DCI. The first-type DCI includes the first MCS field and the first repetition number indicator field and the second-type DCI includes the second MCS field and the second repetition number indicator field. The two types of DCI can share the same DCI format. Therefore, when maintaining the DCI format unchanged, an indication including the MCS index, when whether the first MCS can be used, can be completed, so that no additional DCI bit overhead is added and the compatibility with the related art is strong.

Figure 6:
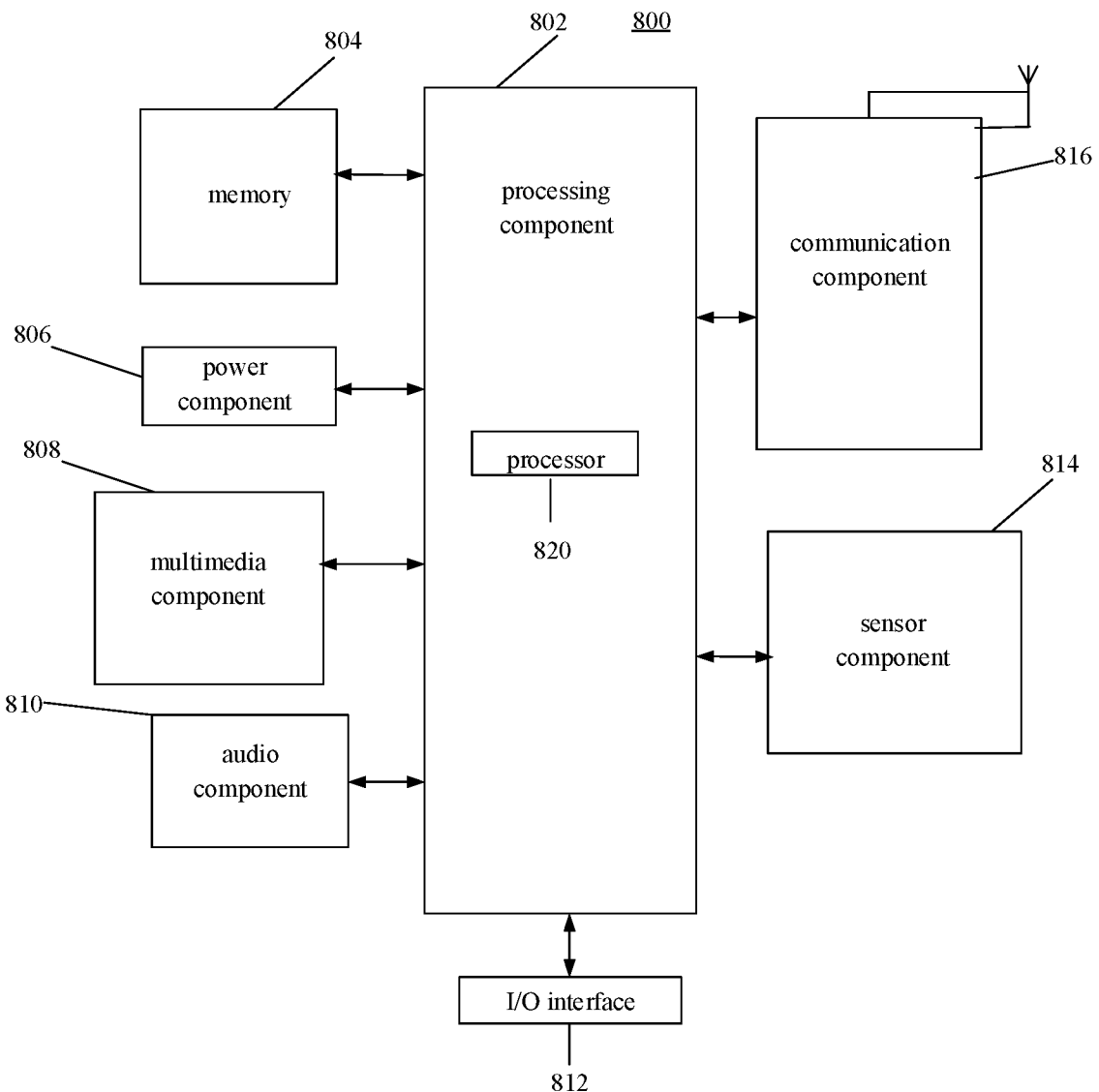
FIG. 6 is a block diagram of a first-type terminal, according to embodiments of the disclosure.

With reference to a terminal 800 in FIG. 6, a terminal 800 is provided according to embodiments of the disclosure. Terminal may be a mobile phone, a computer, a digital broadcast terminal, a messaging device, a gaming console, a tablet, a medical device, exercise equipment, a personal digital assistant, and the like.

Referring to FIG. 6, the terminal 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the terminal 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the terminal 800. Examples of such data include instructions for any applications or methods operated on the terminal 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the terminal 800. The power component 806 may include a power management system, one or more power sources, and any other components associated with the generation, management, and distribution of power in the terminal 800.

The multimedia component 808 includes a screen providing an output interface between the terminal 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the terminal 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the terminal 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the terminal 800. For instance, the sensor component 814 may detect an open/closed status of the terminal 800, relative positioning of components, e.g., the display and the keypad, of the terminal 800, a change in position of the terminal 800 or a component of the terminal 800, a presence or absence of user contact with the terminal 800, an orientation or an acceleration/deceleration of the terminal 800, and a change in temperature of the terminal 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the terminal 800 and other devices. The terminal 800 can access a wireless network based on a communication standard, such as WiFi, 2G, or 3G, or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the terminal 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 804, executable by the processor 820 in the terminal 800, for performing the above-described methods. For example, the non-transitory computer-readable storage medium may be a ROM, a RAM, a CD-ROM, a magnetic tape, a floppy disc, an optical data storage device, and the like.

The terminal may be used to implement the aforementioned method for transmitting or receiving DCI, for example, the method for receiving DCI described in FIG. 3A and/or FIG. 3B.

Figure 7:
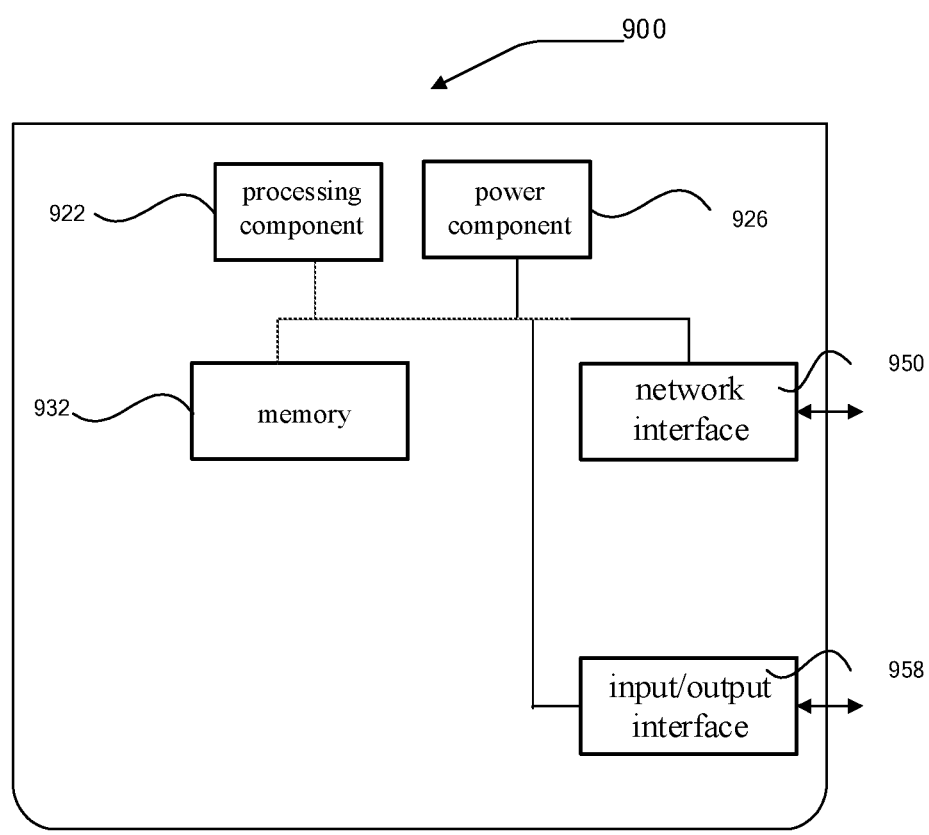
FIG. 7 is a block diagram of a base station, according to embodiments of the disclosure.

FIG. 7 is a block diagram of a base station 900 according to embodiments of the disclosure. For example, the base station 900 may be provided as a network side device. With reference to FIG. 7, the base station 900 may include a processing component 922 that further includes one or more processors and a memory resource represented by a memory 932 for storing instructions executable by the processing component 922, such as application programs. The application programs stored in the memory 932 may include one or more modules each corresponds to a set of instructions.

Further, the processing component 922 may be configured to execute the instructions to perform the method for transmitting DCT in any above embodiment, for example, the method described in FIG. 2A and/or FIG. 2B.

The base station 900 may also include a power supply 926 for the power management of the base station 900, wired or wireless network interfaces 950 for connecting the base station 900 to the network and an input/output interfaces 958. The base station 900 may operate based on an operating system stored in memory 932 such as Windows Server™, Mac OS X™, Unix™, Linux™, FreeBSD™, or the like.

The wireless network interface 950 includes, but is not limited to, the antenna of the aforementioned communication device. Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for transmitting downlink control information (DCI), applicable to a network device, comprising:
   transmitting DCI based on a modulation and coding scheme (MCS) corresponding to a user equipment (UE);
   wherein, the DCI is a first-type DCI or a second-type DCI, the first-type DCI comprises a first MCS field and a first repetition number indicator field; and the second-type DCI comprises a second MCS field and a second repetition number indicator field;
   wherein,
   a bit length of the first MCS field is longer than a bit length of the second MCS field;
   a bit length of the first repetition number indicator field is shorter than a bit length of the second repetition number indicator field; and
   a sum of bit lengths of the first MCS field and the first repetition number indicator field is the same as a sum of bit lengths of the second MCS field and the second repetition number indicator field.

2. The method of claim 1, wherein,
   the first MCS field comprises the second MCS field and a first part of bits of the second repetition number indicator field; and
   the first repetition number indicator field comprises a second part of bits of the second repetition number indicator field.

3. The method of claim 1, wherein the first repetition number indicator field comprises one of:
   a repeated-transmission number indicator field on a data channel; and
   a repeated-transmission number indicator field on a control channel.

4. The method of claim 1, wherein,
   the first repetition number indicator field in the first-type DCI corresponds to a first candidate set that includes one or more candidate numbers of repeated transmissions;
   the second repetition number indicator field in the second-type DCI corresponds to a second candidate set that includes one or more candidate numbers of repeated transmissions,
   wherein the first candidate set is a subset of the second candidate set.

5. The method of claim 4, wherein,
   when the first repetition number indicator field comprises a repetition number indicator field for repeated transmissions on a data channel, candidate numbers of repeated transmissions in the first candidate set, respectively corresponding to a repetition number indicator field for a physical uplink shared channel (PUSCH) and a repetition number indicator field for a physical downlink shared channel (PDSCH), are:
   extracted from the second candidate set by different selection manners.

6. The method of claim 4, wherein,
   the one or more candidate numbers of repeated transmissions in the first candidate set comprises: one or more minimum candidate numbers of repeated transmissions, extracted from the second candidate set; or
   the one or more candidate numbers of repeated transmissions in the first candidate set comprises: one or more candidate numbers of repeated transmissions, uniformly extracted from the second candidate set; or
   the one or more candidate numbers of repeated transmissions in the first candidate set comprises: one or more candidate numbers of repeated transmissions, non-uniformly extracted from the second candidate set; or
   the one or more candidate numbers of repeated transmissions in the first candidate set comprises: M candidate numbers of repeated transmissions, less than or equal to a preset number, extracted from the second candidate set, and N candidate numbers of repeated transmissions, greater than the preset number, extracted from the second candidate set, M is greater than N, and both M and N are positive integers.

7. The method of claim 1, wherein the first MCS field indicates a first MCS, wherein the first MCS comprises 16 quadrature amplitude modulation (QAM).

8. The method of claim 1, wherein the first-type DCI corresponds to a UE that supports a first MCS and the second-type DCI corresponds to a UE that does not support the first MCS.

9. The method of claim 1, wherein DCI formats of the first-type DCI and the second-type DCI are same.

10. A method for receiving downlink control information (DCI), applied for a user equipment (UE), comprising:
    receiving DCI transmitted based on a modulation and coding scheme (MCS) corresponding to the UE;
    wherein, the DCI is a first-type DCI or a second-type DCI, the first-type DCI comprises a first MCS field and a first repetition number indicator field; and the second-type DCI comprises a second MCS field and a second repetition number indicator field;
    wherein,
    a bit length of the first MCS field is longer than a bit length of the second MCS field;
    a bit length of the first repetition number indicator field is shorter than a bit length of the second repetition number indicator field; and a sum of bit lengths of the first MCS field and the first repetition number indicator field is the same as a sum of bit lengths of the second MCS field and the second repetition number indicator field.

11. The method of claim 10, wherein, the first MCS field comprises the second MCS field and a first part of bits of the second repetition number indicator field; and
the first repetition number indicator field comprises a second part of bits of the second repetition number indicator field.

12. The method of claim 10, wherein the first repetition number indicator field comprises one of:
a repeated-transmission number indicator field on a data channel; and
a repeated-transmission number indicator field on a control channel.

13. The method of claim 10, wherein, the first repetition number indicator field in the first-type DCI corresponds to a first candidate set that includes one or more candidate numbers of repeated transmissions;
the second repetition number indicator field in the second-type DCI corresponds to a second candidate set that includes one or more candidate numbers of repeated transmissions,
wherein the first candidate set is a subset of the second candidate set.

14. The method of claim 13, wherein, when the first repetition number indicator field comprises a repetition number indicator field for repeated transmissions on a data channel, candidate numbers of repeated transmissions in the first candidate set, respectively corresponding to a repetition number indicator field for a physical uplink shared channel (PUSCH) and a repetition number indicator field for a physical downlink shared channel (PDSCH), are: extracted from the second candidate set by different selection manners.

15. The method of claim 13, wherein,
the one or more candidate numbers of repeated transmissions in the first candidate set comprises: one or more minimum candidate numbers of repeated transmissions, extracted from the second candidate set, or
the one or more candidate numbers of repeated transmissions in the first candidate set comprises: one or more candidate numbers of repeated transmissions, uniformly extracted from the second candidate set, or
the one or more candidate numbers of repeated transmissions in the first candidate set comprises: one or more candidate numbers of repeated transmissions, non-uniformly extracted from the second candidate set; or
the one or more candidate numbers of repeated transmissions in the first candidate set comprises: M candidate numbers of repeated transmissions, less than or equal to a preset number, extracted from the second candidate set, and N candidate numbers of repeated transmissions, greater than the preset number, extracted from the second candidate set, M is greater than N, and both M and N are positive integers.

16. The method of claim 10, wherein the first MCS field indicates a first MCS, wherein the first MCS comprises 16 quadrature amplitude modulation (QAM).

17. The method of claim 10, wherein the first-type DCI corresponds to a UE that supports a first MCS and the second-type DCI corresponds to a UE that does not support the first MCS.

18. The method of claim 10, wherein DCI formats of the first-type DCI and the second-type DCI are same.

19. A communication device, comprising:
an antenna;
a memory; and
a processor, connected respectively to the antenna and the memory, and configured to, by executing an executable program stored on the memory:
control the antenna to transmit and receive wireless signals; and
transmit downlink control information (DCI) based on a modulation and coding scheme (MCS) corresponding to a user equipment (UE);
wherein, the DCI is a first-type DCI or a second-type DCI, the first-type DCI comprises a first MCS field and a first repetition number indicator field; and the second-type DCI comprises a second MCS field and a second repetition number indicator field;
wherein,
a bit length of the first MCS field is longer than a bit length of the second MCS field;
a bit length of the first repetition number indicator field is shorter than a bit length of the second repetition number indicator field; and
a sum of bit lengths of the first MCS field and the first repetition number indicator field is the same as a sum of bit lengths of the second MCS field and the second repetition number indicator field.

20. A communication device, comprising:
an antenna;
a memory; and
a processor, connected respectively to the antenna and the memory, and configured to, by executing an executable program stored on the memory:
control the antenna to transmit and receive wireless signals; and
receive downlink control information (DCI) transmitted based on a modulation and coding scheme (MCS) corresponding to a user equipment (UE);
wherein, the DCI is a first-type DCI or a second-type DCI, the first-type DCI comprises a first MCS field and a first repetition number indicator field; and the second-type DCI comprises a second MCS field and a second repetition number indicator field;
wherein,
a bit length of the first MCS field is longer than a bit length of the second MCS field;
a bit length of the first repetition number indicator field is shorter than a bit length of the second repetition number indicator field; and
a sum of bit lengths of the first MCS field and the first repetition number indicator field is the same as a sum of bit lengths of the second MCS field and the second repetition number indicator field.

* * * * *